US012366421B2

(12) United States Patent
Kilchyk

(10) Patent No.: US 12,366,421 B2
(45) Date of Patent: Jul. 22, 2025

(54) THERMALLY ADAPTIVE FLOW CONDUIT

(71) Applicant: Hamilton Sundstrand Corporation, Charlotte, NC (US)

(72) Inventor: Viktor Kilchyk, Lancaster, NY (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 178 days.

(21) Appl. No.: 18/166,754

(22) Filed: Feb. 9, 2023

(65) Prior Publication Data
US 2024/0271890 A1 Aug. 15, 2024

(51) Int. Cl.
F28F 21/00 (2006.01)
F28F 19/00 (2006.01)

(52) U.S. Cl.
CPC ............ *F28F 21/00* (2013.01); *F28F 19/006* (2013.01); *F28F 2265/14* (2013.01); *F28F 2265/18* (2013.01)

(58) Field of Classification Search
CPC .. F28F 19/006; F28F 2265/14; F28F 2265/18; F28F 2255/04; F28F 2265/26; F02C 7/042
USPC ...................................... 165/134.1
See application file for complete search history.

(56) References Cited

U.S. PATENT DOCUMENTS

| 4,346,564 | A | | 8/1982 | Gemma et al. |
| 5,117,094 | A | * | 5/1992 | Jensen ............... H05B 3/146 |
| | | | | 219/535 |
| 8,712,227 | B2 | | 4/2014 | Meisiek et al. |
| 8,820,362 | B2 | * | 9/2014 | Roederer ............... B64D 11/02 |
| | | | | 392/480 |
| 10,384,786 | B2 | | 8/2019 | Greenberg et al. |
| 10,883,777 | B2 | * | 1/2021 | Wood ................. H05K 7/20445 |
| 10,932,326 | B2 | * | 2/2021 | Venkataramu ...... B29C 63/0073 |
| 2007/0184238 | A1 | | 8/2007 | Hockaday et al. |
| 2018/0058472 | A1 | | 3/2018 | Tajiri et al. |

FOREIGN PATENT DOCUMENTS

| CN | 101394689 B | 9/2010 |
| CN | 109642501 A | 4/2019 |
| CN | 114076086 A | 2/2022 |
| EP | 2547994 A1 | 1/2013 |
| JP | 244000 B2 | 2/1990 |
| WO | 2021072345 A1 | 4/2021 |

OTHER PUBLICATIONS

Extended European Search Report for European Patent No. 24156840.1, Dated Jun. 14, 2024, 6 Pages.

* cited by examiner

Primary Examiner — Jon T. Schermerhorn, Jr.
(74) Attorney, Agent, or Firm — Kinney & Lange, P.A.

(57) ABSTRACT

A flow conduit intended for use in a fouling environment includes at least one solid surface of a thermally adaptive material. The at least one solid surface is configured to undergo a shape change as a result of thermal cycling such the shape change dislodges unwanted material accumulated on the at least one solid surface during operation of the flow conduit in the fouling environment.

9 Claims, 4 Drawing Sheets

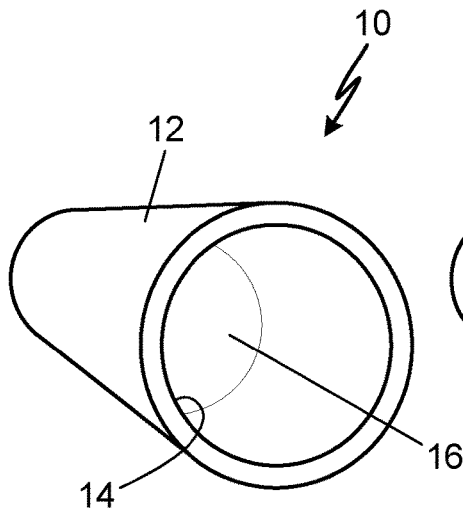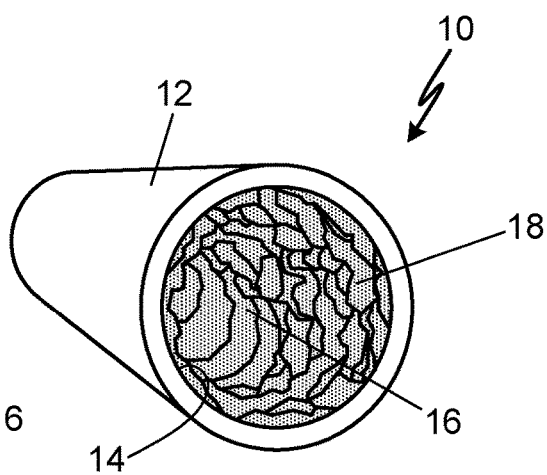
Fig. 1A  Fig. 1B
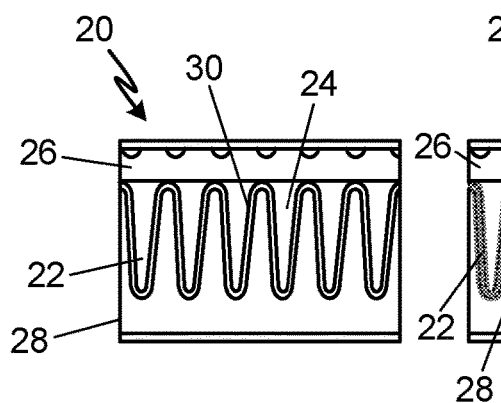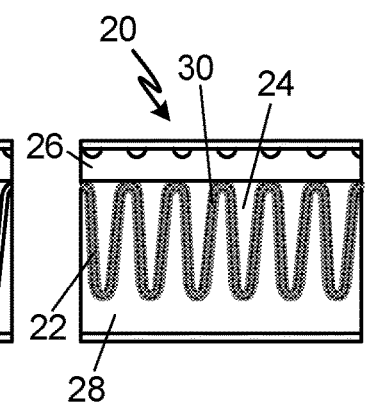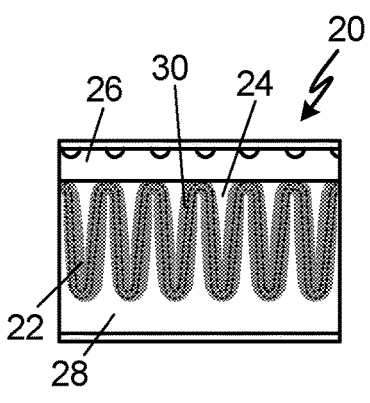
Fig. 2A  Fig. 2B  Fig. 2C
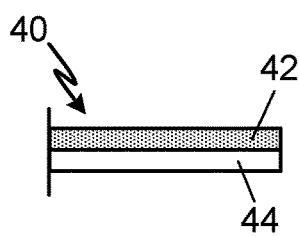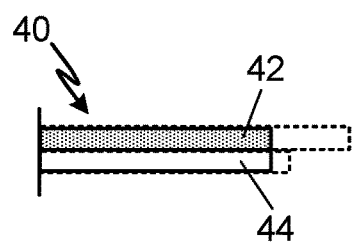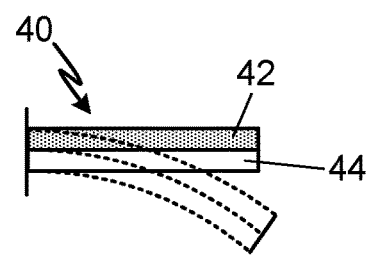
Fig. 3A  Fig. 3B  Fig. 3C

T2 > T1

T1

THERMALLY ADAPTIVE FLOW CONDUIT

BACKGROUND

The present disclosure relates generally to flow conduits and in particular to flow conduits used in environments subject to fouling.

Flow conduits such as tubes, heat exchanger coils, and other solid structures used in flow devices such as heat exchangers, turbomachinery, fluid separators, and other flow devices are often used in environments that can cause fouling deposits on surfaces of the flow conduits. Fouling can be detrimental to the function of such flow devices by impeding fluid flow, causing undesired flow conditions (e.g., creating turbulent flow when laminar flow is desired), and/or impairing heat transfer.

SUMMARY

According to one aspect of the present invention, a flow conduit intended for use in a fouling environment includes at least one solid surface of a thermally adaptive material. The at least one solid surface is configured to undergo a shape change as a result of thermal cycling such the shape change dislodges unwanted material accumulated on the at least one solid surface during operation of the flow conduit in the fouling environment.

According to another aspect of the present invention, a conduit intended for use in a fouling environment includes at least one solid surface of a thermally adaptive material. The at least one solid surface is configured to undergo a shape change in a radial direction as a result of thermal cycling such the shape change dislodges unwanted material accumulated on the at least one solid surface during operation of the conduit in the fouling environment. The unwanted material accumulated on the at least one solid surface is one or more of an inorganic deposit, an organic deposit, a biologic deposit, or an ice frost deposit.

According to yet another aspect of the present invention, a heat exchanger coil intended for use in a fouling environment includes a continuous hollow flow conduit formed into a repeating serpentine geometry having at least one solid surface. The continuous hollow flow conduit includes a thermally adaptive material. The at least one solid surface is configured to undergo a shape change in a lateral direction as a result of thermal cycling such the shape change dislodges unwanted material accumulated on the at least one solid surface during operation of the heat exchanger coil in the fouling environment. The unwanted material accumulated on the at least one solid surface is one or more of an inorganic deposit, an organic deposit, a biologic deposit, or an ice frost deposit.

BRIEF DESCRIPTION OF THE DRAWINGS

FIG. 1A is a perspective view of an unfouled tube, such as a heat exchanger tube.

FIG. 1B is a perspective view of a fouled tube, such as a heat exchanger tube.

FIG. 2A is a view of a clean heat exchanger coil.

FIG. 2B is a view of a heat exchanger coil fouled with ice.

FIG. 2C is a view of a heat exchanger coil frosted to block the adjacent flow channel.

FIG. 3A is a two layer structure in which each layer has a different coefficient of thermal expansion.

FIG. 3B is the two layer structure of FIG. 3A showing the layers deforming independently when thermally cycled.

FIG. 3C is the two layer structure of FIG. 3A showing the layers deforming together when thermally cycled.

DETAILED DESCRIPTION

Figure 4A:
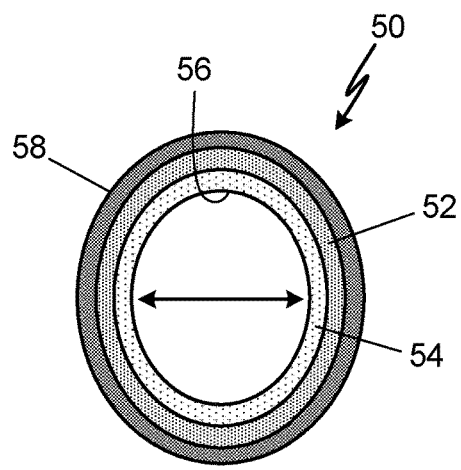
FIG. 4A is a tube made from a thermally adaptive material at a first thermal state.

Flow devices such as heat exchangers, turbomachinery, fluid separators, and other flow devices are commonly used in a variety of aerospace and other industrial applications. Such flow devices include various flow conduits, such as tubes, heat exchanger coils, heat exchanger fins, and other solid structures exposed to fluids when in operation. Many operating environments for such flow devices can cause fouling deposits to form on solid surfaces of the flow conduits, thereby impeding fluid flow, causing undesired flow conditions (e.g., creating turbulent flow when laminar flow is desired), increasing pressure drop, impairing heat transfer/thermal efficiency, and/or adding weight. This disclosure refers to such an operating environment as a "fouling environment." For purposes of this disclosure "fouling" should be understood to be the formation of unwanted deposits (including ice buildup or deposits and frosting), encrustation, crudding, deposition, scaling, scale formation, slagging, and sludge formation on solid surfaces of the flow conduits. The unwanted deposits may be one or more of an inorganic deposit, an organic deposit, a biologic deposit, or an ice or frost deposit.

I have found that making at least part of such a flow device from a thermally adaptive material can address fouling on the flow device. In the context of this disclosure a "thermally adaptive material" means a material that changes shape with thermal cycling (i.e., a change in temperature) to break up fouling or buildup that forms on the flow conduit through use. As described further below, the thermally adaptive material can include two or more layers with different coefficients of thermal expansion (CTE) that deform differently with thermal cycling. Different CTEs may be achieved using two different material types (which can be metals, polymers, or any other material suitable for a particular application) that inherently have different CTEs or the same material with metallic, carbon, fibers (e.g., Kevlar fibers), of other additives that alter the material's CTE. Alternately, the thermally adaptive material can include a first material having a first CTE dispersed in a matrix of a second material having a second CTE. The thermally adaptive material may manufactured using additive manufacturing techniques (e.g., 3D printing). Other types of thermally adaptive materials also fall within the scope of this disclosure.

FIG. 1A is a perspective view of an unfouled tube 10, such as a heat exchanger tube. The tube 10 includes an outer surface 12 (i.e., an outer diameter) and an inner surface 14

(i.e., an inner diameter) that defines a flow channel 16. Depending on the application, the tube 10 may be configured such that a fluid flows through the flow channel 16 and/or a different fluid flows around the outer surface 12.

FIG. 1B is a perspective view of tube 10 after its flow channel 16 has been exposed to a fouling environment. As shown in FIG. 1B, flow channel 16 is partially obstructed by fouling deposit 18 that formed during operation of tube 10. In the tube 10 illustrated in FIG. 1B, the fouling deposit 18 can obstruct flow, increase pressure drop, decrease thermal transfer efficiency and/or cause another deleterious impact on flow through the flow channel 16. The fouling deposit 18 can be any undesirable deposit, including but not limited to ice, dust, rust, or any type of undesirable rigid or semi-rigid deposit. Although FIG. 1B illustrates a fouling deposit 18 forming in the flow channel 16, in some applications a similar fouling deposit could form on the outer surface 12 of tube 10 instead of or in addition to forming in the flow channel 16.

FIG. 2A illustrates another flow conduit within the scope of this disclosure—a heat exchanger coil 20. As illustrated, heat exchanger coil 20 is a hollow, serpentine structure 22 configured to channel a fluid through an internal flow channel (not shown) in the hollow, serpentine structure 22. The hollow serpentine structure 22 is positioned in an external flow channel 24 that is defined by a first wall 26 and a second wall 28. The external flow channel 24 is configured to channel a fluid around the outer surface 30 of the hollow, serpentine structure 22.

FIG. 2B is a view of heat exchanger coil 20 after the hollow serpentine structure 22 has become fouled with ice 32. This could occur, for example, if the heat exchanger coil 20 is used to cool humid air flowing through the external flow channel 24. Depending on operating conditions, water in the humid air can condense on the outer surface 30 of the hollow, serpentine structure 22 and freeze to form ice 32. The ice 32 on the outer surface 30 of the hollow, serpentine structure 22 can obstruct flow, increase pressure drop, decrease thermal transfer efficiency and/or cause another deleterious impact on flow through the external flow channel 24.

FIG. 2C is a view of heat exchanger coil 20 after ice 32 on the outer surface 30 of the hollow, serpentine structure 22 has frosted over to block flow through the external flow channel 24. The situation that FIG. 2C shows is potentially more impactful to operation of heat exchanger coil 20 than the situation that FIG. 2B shows.

FIG. 3A shows a two layer structure 40 having a first layer 42 and a second layer 44, each of which has a different coefficient of thermal expansion (CTE). As discussed further below, the first layer 42 and the second layer 44 are configured such that the two layer structure 40 changes shape as a result of temperature changes associated with thermal cycling. As discussed above, the two layers 42, 44 can be made from two different materials (which can be metals, polymers, or any other material suitable for a particular application) that inherently have different CTEs or the same material with metallic, carbon, fibers (e.g., Kevlar fibers), or other additives that alter the material's CTE. Such additives can be dispersed in the material in such a way as to cause the material to change shape in a preferred direction or dimension as a result of thermal cycling. The thermally adaptive material may manufactured using additive manufacturing techniques (e.g., 3D printing). Although described and shown as having only two layers, a person of ordinary skill will understand that two layer structure 40 may, in fact, have more than two layers (e.g., three layers, four layers, or even more layers) as long as at least two layers have different CTEs. Accordingly, in the context of this disclosure, the term "two layer structure" is not limited to two layer. The term "two layer structure" encompasses structures having two layers, three layers, four layers, or any number of layers as long at least two of the layers have different CTEs.

FIG. 3B shows the two layer structure 40 in which the first layer 42 has a CTE greater than the CTE of the second layer 44. If the two layers 42, 44 are allowed to deform independently, the first layer 42 grows in a lateral direction to a greater extent than second layer 44 as FIG. 3B shows. If the two layers 42, 44 are constrained to deform together, the two layer structure 40 deflects in the direction of the second layer 42 (shown in FIG. 3C) because the CTE of the second layer 42 is less than the CTE of the first layer 42 (i.e., the first layer 42 grows in a lateral direction to a greater extent than second layer 44 causing deflection in the direction of the second layer 44).

FIG. 4A shows a tube 50 made from a thermally adaptive material in a first thermal state. As illustrated, tube 50 (which could also be referred to as a conduit or channel) has an oval cross-section in the first thermal state, which in the illustrated example is a "cold" state (i.e., "cold" relative to the temperature it experiences during operation). Tube 50 is made from a two layer structure, such as the two layer structures described above and shown in FIGS. 3A-3C. As such, tube 50 includes a first layer 52 and second layer 54. Each of first layer 52 and second layer 54 have a different CTE that the other layer that forms tube 50.

Figure 4B:
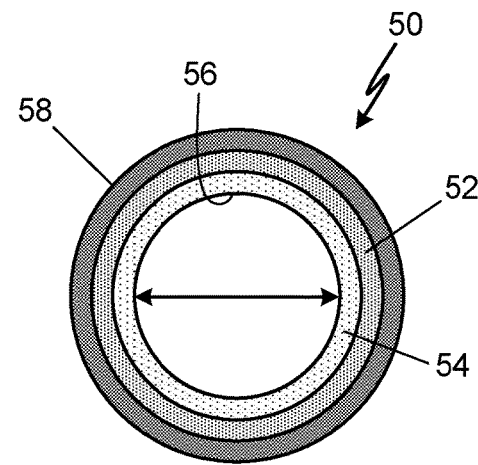
FIG. 4B is a tube made from a thermally adaptive material at a second thermal state.

FIG. 4B shows tube 50 in a second thermal state that is consistent with an operational state. The temperature of the second thermal state is higher than the temperature of the first thermal state described with regard to FIG. 4A. FIG. 4B shows that in a second thermal state, tube 50 changes shape such that it has a circular cross-section, contrasted with the oval cross-section that tube 50 had in the first thermal state (see FIG. 4A.) The shape change that tube 50 undergoes between the first thermal state (FIG. 4A) and the second thermal state (FIG. 4B) is due to the thermally adaptive material from which tube 50 is made. As a result of the shape change, thermally cycling tube 50 between an operating state (the second thermal state) and a non-operating state (the first thermal state) results in any unwanted material (i.e., fouling including but not limited to any undesirable deposit, including but not limited to ice, dust, rust, or any type of undesirable rigid or semi-rigid deposit) that forms on an inside surface 56 or outside surface 58 of tube 50 to be dislodged (i.e., broken up), effectively moving tube 50 from a "fouled" state during operation to a "clean" state in a non-operating state. As shown in FIGS. 4A and 4B, a tube 50 (or any other type of conduit) may be designed such that thermal expansion gradients create a variable cross-section shape. While FIGS. 4A and 4B show a tube 50 with uniform thermal expansion characteristics around the cross-section, a similar tube could be constructed with variable thermal expansion characteristics around the cross-section. For example, sections of tube 50 at the "top" and "bottom" of the oval cross-section shown in FIG. 4A can have different thermal expansion characteristics that other portions of tube 50. The thermal expansion characteristics along the length of the tube 50 (or any other type of conduit) may be tailored for each particular application by appropriate choice of material and may have no thermal expansion, "normal" thermal expansion (i.e., thermal expansion based on the CTE of the underlying material), or another thermal expansion profile that is desirable for a particular application.

Figure 5A:
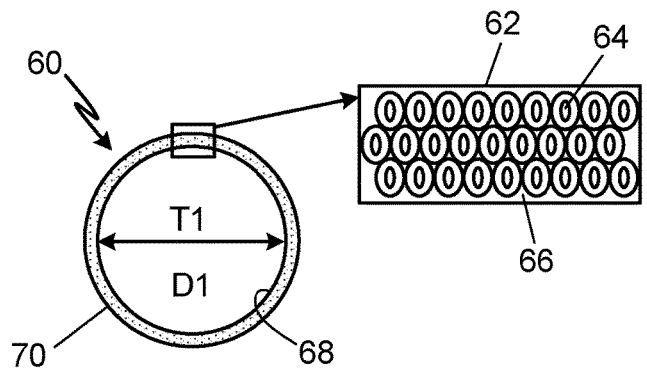
FIG. 5A is another tube made from a thermally adaptive material at a first thermal state.
Figure 5B:
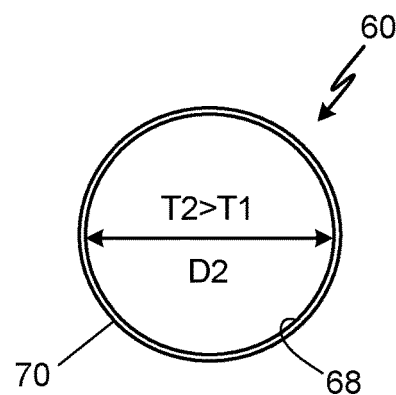
FIG. 5B is another tube made from a thermally adaptive material at a second thermal state.
Figure 6B:
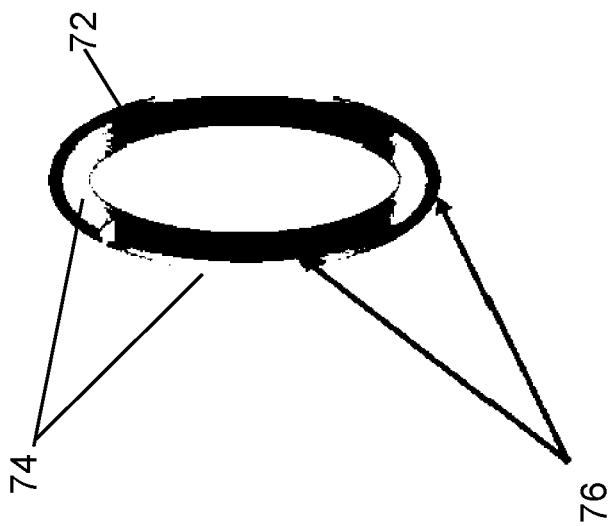
FIG. 6B is a schematic of a conduit wall made from a thermally adaptive material at a second thermal state.

FIGS. 5A and 5B show another tube 60 made from a different thermally adaptive material 62 than the tube 50, which FIGS. 4A and 4B show. FIG. 5A shows tube 60 in a first thermal state, which is a "cold" state (i.e., "cold" relative to the temperature it experiences during operation). The thermally adaptive material 62 from which tube 60 is made includes a first material 64 having a first CTE dispersed in a matrix of a second material 66 having a second CTE. The first material 64 and second material 66 should be mutually insoluble such that they form distinct phases with distinct properties when formed into the thermally adaptive material 62. The shape and distribution of the first material 64 in the second material 66 may be selected to cause the thermally adaptive material 62 to undergo a uniform shape change in all dimensions. As a result, tube 60 made from such as thermally adaptive material 62 can change from a circular cross-section with a first diameter (D1) at in a first thermal (non-operating) state (T1) (as shown in FIG. 5A) to a circular cross-section with a second diameter (D2) at in a second thermal (operating) state (T2) (as shown in FIG. 5B), where T2>T1 and D2>D1. The shape change that tube 60 undergoes between the first thermal state (FIG. 5A) and the second thermal state (FIG. 5B) is due to the thermally adaptive material 62 from which tube 60 is made. As a result of the shape change, thermally cycling tube 60 between an operating state (the second thermal state) and a non-operating state (the first thermal state) results in any unwanted material (i.e., fouling) that forms on an inside surface 68 or outside surface 70 of tube 60 to be dislodged (i.e., broken up), effectively moving tube 60 from a "fouled" state during operation to a "clean" state in a non-operating state. While FIGS. 5A and 6B show a tube 60 with uniform thermal expansion characteristics around the cross-section, in another embodiment (not shown) a similar tube could be constructed with a thermally adaptive material 62 having different thermal expansion characteristics at different locations around the cross-section. For example, sections of tube 60 at the "top" and "bottom" of cross-section shown in FIG. 5A can have different thermal expansion characteristics than other portions of tube 60. Such an embodiment can be configured such that deformation at the "top" and "bottom" of the cross-section increases in curvature with an increase in temperature and deformation at the "sides" of the cross-section decreases in curvature with an increase in temperature, resulting in a cross-section that becomes more "oval" with an increase in temperature. Similarly, the thermal expansion characteristics along the length of the tube 60 (or any other type of conduit) may be tailored for each particular application by appropriate choice of material and may have no thermal expansion, "normal" thermal expansion (i.e., thermal expansion based on the CTE of the underlying material), or another thermal expansion profile that is desirable for a particular application.

Figure 6A:
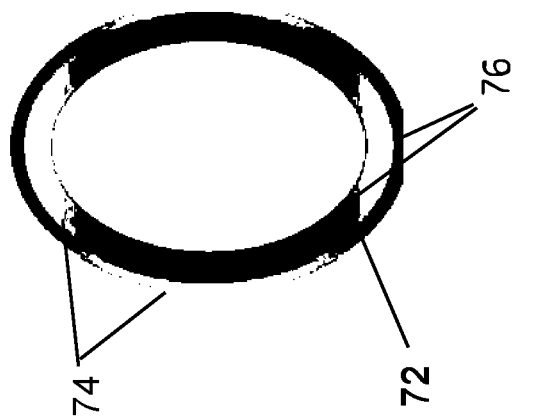
FIG. 6A is a schematic of a conduit wall made from a thermally adaptive material at a first thermal state.

FIGS. 6A and 6B show a conduit wall 72 made from a thermally adaptive material, such as any of the thermally adaptive materials discussed above. Conduit wall 72 is intended to be a schematic of any conduit wall, either open or closed, consistent with the present disclosure. The thermally adaptive material used to make conduit wall 72 is configured such that the conduit wall 72 changes shape in a lateral direction (shown in FIG. 6B) as a result of thermal cycling between a non-operating state (the first thermal state) and an operating state (the second thermal state). As a result of the shape change, thermally conduit wall 72 between an operating state (the second thermal state) and a non-operating state (the first thermal state) results in any unwanted material (i.e., fouling) that forms on conduit wall 72 to be dislodged (i.e., broken up), effectively moving conduit wall 72 from a "fouled" state during operation to a "clean" state in a non-operating state. As shown in FIGS. 6A and 6B, conduit wall 72 (or any other type of conduit) may be designed such that thermal expansion gradients create a variable cross-section shape. While FIGS. 6A and 6B show conduit wall 72 with uniform thermal expansion characteristics, a conduit wall 72 could be constructed with variable thermal expansion characteristics at various desirable points. For example, sections of conduit wall 72 shown in FIG. 6A can have different thermal expansion characteristics that other portions of conduit wall 72. The thermal expansion characteristics along the length of the conduit wall 72 (or any other type of conduit) may be tailored for each particular application by appropriate choice of material and may have no thermal expansion, "normal" thermal expansion (i.e., thermal expansion based on the CTE of the underlying material), or another thermal expansion profile that is desirable for a particular application.

Figure 7A:
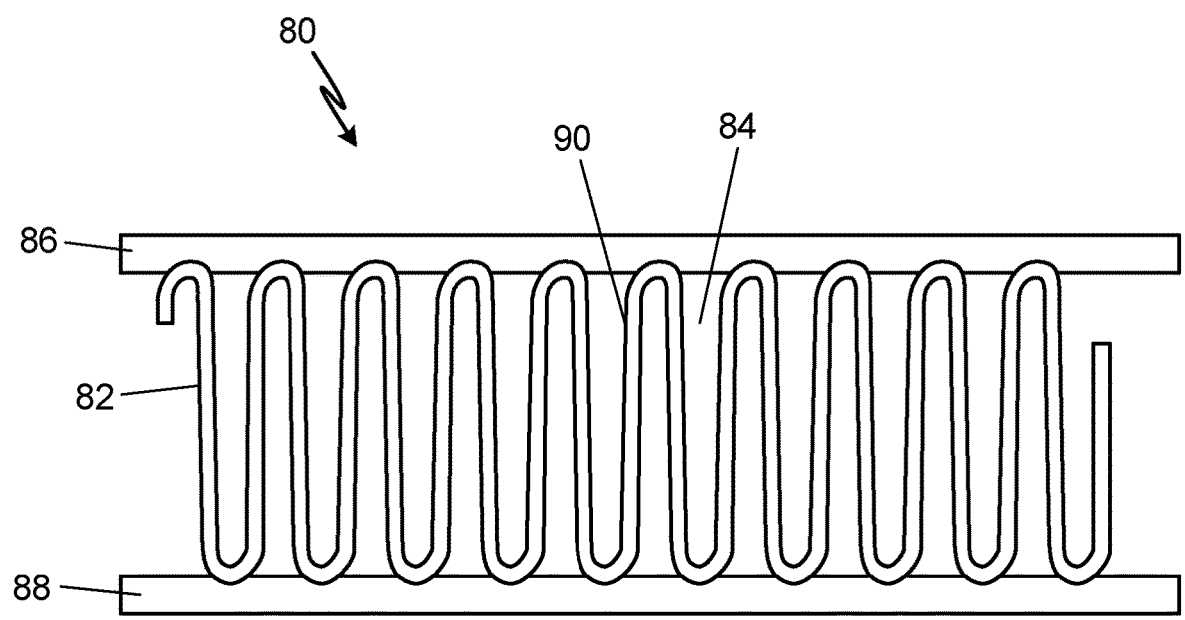
FIG. 7A is a heat exchanger coil made from a thermally adaptive material in a first thermal state.
Figure 7B:
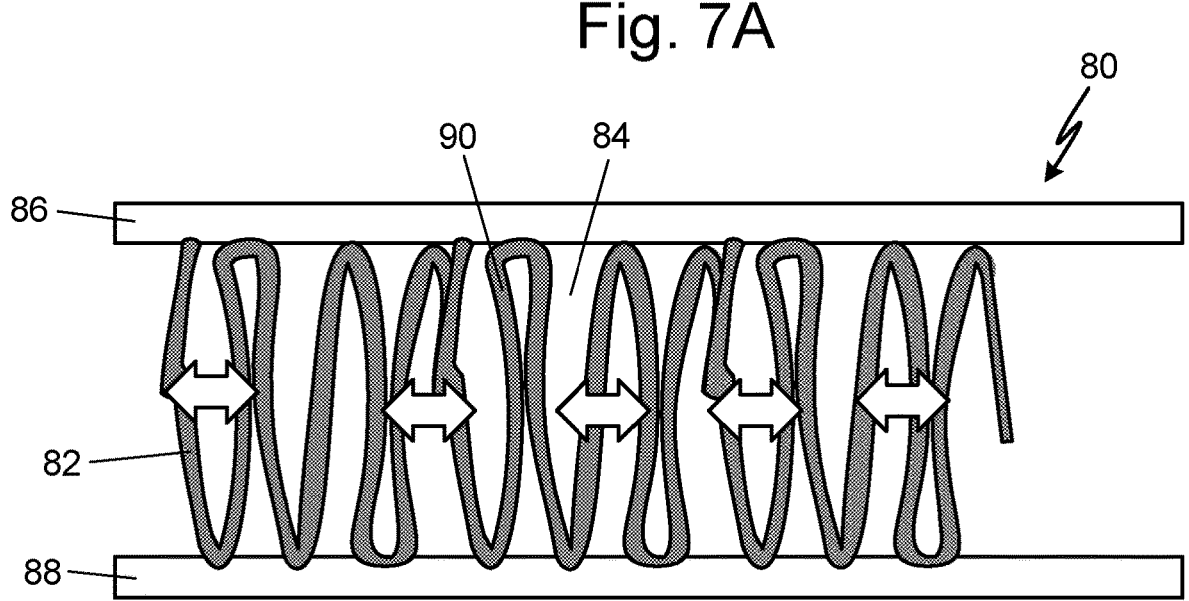
FIG. 7B is a heat exchanger coil made from a thermally adaptive material in a second thermal state.

FIG. 7A and 7B show a heat exchanger coil 80 made from a thermally adaptive material, such as any of the thermally adaptive materials discussed above. Heat exchanger coil 80 has the same geometry as the heat exchanger coil 20 shown in FIGS. 2A-2C and as discussed above. Accordingly, heat exchanger coil 80 includes a hollow, serpentine structure 82 configured to channel a fluid through an internal flow channel (not shown) in the hollow, serpentine structure 82. The hollow serpentine structure 82 is positioned in an external flow channel 84 that is defined by a first wall 86 and a second wall 88. The external flow channel 84 is configured to channel a fluid around the outer surface 90 of the hollow, serpentine structure 82. FIG. 7A shows heat exchanger coil 80 in a first thermal (non-operating) state. The thermally adaptive material used to make heat exchanger coil 80 is configured such that the serpentine structure 82 changes shape in a lateral direction (shown in FIG. 7B) as a result of thermal cycling between a non-operating state (the first thermal state) and an operating state (the second thermal state). As a result of the shape change, thermally cycling heat exchanger coil 80 between an operating state (the second thermal state) and a non-operating state (the first thermal state) results in any unwanted material (i.e., fouling) that forms on an outer surface 90 of the hollow, serpentine structure 82 to be dislodged (i.e., broken up), effectively moving heat exchanger coil 80 from a "fouled" state during operation to a "clean" state in a non-operating state. As shown in FIGS. 7A and 7B, a heat exchanger coil 80 (or any other type of conduit) may be designed such that thermal expansion gradients create a variable cross-section shape. While FIGS. 7A and 7B show a heat exchanger coil 80 with uniform thermal expansion characteristics, a similar heat exchanger coil could be constructed with variable thermal expansion characteristics around the cross-section. For example, sections of heat exchanger coil 80 shown in FIG. 7A can have different thermal expansion characteristics that other portions of heat exchanger coil 80. The thermal expansion characteristics along the length of the heat exchanger coil 80 (or any other type of conduit) may be tailored for each particular application by appropriate choice of material and may have no thermal expansion, "normal" thermal expansion (i.e., thermal expansion based on the CTE of the underlying material), or another thermal expansion profile that is desirable for a particular application.

The thermally adaptive materials discussed in this disclosure may be metallic or non-metallic materials suited for the intended application (e.g., having required structural and thermal properties). The flow conduits and thermally adaptive materials described in this disclosure can be made from additive manufacturing, including 3-D printing, techniques that are well known. Of course, such flow conduits and thermally adaptive materials can be made from any other manufacturing techniques that a person of ordinary skill would deem suitable for a particular application.

A flow conduit, such as a tube or heat exchanger core, made from a thermally adaptive material as described in this disclosure provides numerous advantages. Incorporating thermally adaptive material into the flow conduit can improve thermal efficiency, lower maintenance requirement, prolong service life, and reduce time need to use previous method of removing fouling—particularly removing icing or frost.

Discussion of Possible Embodiments

The following are non-exclusive descriptions of possible embodiments of the present invention.

An embodiment of a flow conduit intended for use in a fouling environment includes at least one solid surface comprising a thermally adaptive material. The at least one solid surface is configured to undergo a shape change as a result of thermal cycling such the shape change dislodges unwanted material accumulated on the at least one solid surface during operation of the flow conduit in the fouling environment.

The flow conduit of the preceding paragraph can optionally include, additionally and/or alternatively, any one or more of the following features, configurations, and/or additional components:

An embodiment in which the thermally adaptive material comprises two layers, each of which has a different coefficient of thermal expansion.

An embodiment in which the flow conduit is a conduit and the at least one solid surface is a wall of the conduit.

An embodiment of paragraph [0039] in which the conduit is configured to undergo a shape change in a longitudinal direction as a result of thermal cycling.

An embodiment of paragraph [0039] in which the conduit is configured to undergo a shape change in a radial direction as a result of thermal cycling.

An embodiment of paragraph [0039] in which the flow conduit is a heat exchanger coil comprising a continuous hollow flow conduit formed into a repeating serpentine geometry and the at least one solid surface is a wall of the heat exchanger coil, wherein the heat exchanger coal is configured to undergo a shape change in a lateral direction as a result of thermal cycling.

An embodiment of paragraph [0037] in which the thermally adaptive material comprises a first material having a first coefficient of thermal expansion dispersed in a matrix of a second material having a second coefficient of thermal expansion.

An embodiment of paragraph [0044] in which the flow conduit is a conduit and the at least one solid surface is a wall of the conduit.

An embodiment of paragraphs [0044] and/or [0045] in which the conduit is configured to undergo a shape change in a longitudinal direction as a result of thermal cycling.

An embodiment of paragraphs [0044] and/or [0045] in which the conduit is configured to undergo a shape change in a radial direction as a result of thermal cycling.

An embodiment of paragraph [0044] the flow conduit is a heat exchanger coil comprising a continuous hollow flow conduit formed into a repeating serpentine geometry and the at least one solid surface is a wall of the heat exchanger coil, wherein the heat exchanger coal is configured to undergo a shape change in a lateral direction as a result of thermal cycling.

An embodiment of any preceding claim in which the unwanted material accumulated on the at least one solid surface comprises one or more of an inorganic deposit, an organic deposit, a biologic deposit, or an ice frost deposit.

An embodiment of a conduit intended for use in a fouling environment includes at least one solid surface including a thermally adaptive material. The at least one solid surface is configured to undergo a shape change in a radial direction as a result of thermal cycling such the shape change dislodges unwanted material accumulated on the at least one solid surface during operation of the conduit in the fouling environment. The unwanted material accumulated on the at least one solid surface includes one or more of an inorganic deposit, an organic deposit, a biologic deposit, or an ice or frost deposit.

The conduit of the preceding paragraph can optionally include, additionally and/or alternatively, any one or more of the following features, configurations, and/or additional components:

An embodiment of the conduit in which the thermally adaptive material includes two layers, each of which has a different coefficient of thermal expansion.

An embodiment of the conduit in which the thermally adaptive material includes a first material having a first coefficient of thermal expansion dispersed in a matrix of a second material having a second coefficient of thermal expansion.

An embodiment of a heat exchanger coil intended for use in a fouling environment includes a continuous hollow flow conduit formed into a repeating serpentine geometry having at least one solid surface, which includes a thermally adaptive material. The at least one solid surface is configured to undergo a shape change in a lateral direction as a result of thermal cycling such the shape change dislodges unwanted material accumulated on the at least one solid surface during operation of the heat exchanger coil in the fouling environment. The unwanted material accumulated on the at least one solid surface comprises one or more of an inorganic deposit, an organic deposit, a biologic deposit, or an ice frost deposit.

The heat exchanger coil of the preceding paragraph can optionally include, additionally and/or alternatively, any one or more of the following features, configurations, and/or additional components:

An embodiment of the heat exchanger coil in which the thermally adaptive material comprises two layers, each of which has a different coefficient of thermal expansion.

An embodiment of the heat exchanger coil in which the thermally adaptive material comprises a first material having a first coefficient of thermal expansion dispersed in a matrix of a second material having a second coefficient of thermal expansion.

While the invention has been described and shown with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A flow conduit intended for use in a fouling environment, comprising:
   at least one solid surface comprising a thermally adaptive material, wherein the at least one solid surface is configured to undergo a shape change as a result of thermal cycling such the shape change dislodges unwanted material accumulated on the at least one solid surface during operation of the flow conduit in the fouling environment; and
   wherein the thermally adaptive material comprises two layers, each of which has a different coefficient of thermal expansion such that the conduit has an oval cross-section at a first temperature and a circular cross-section at an operation temperature which is higher than the first temperature.

2. The flow conduit of claim 1, wherein the at least one solid surface is a wall of the conduit.

3. The flow conduit of claim 2, wherein the conduit is configured to undergo a shape change in a radial direction as a result of thermal cycling.

4. The flow conduit of claim 1, wherein the thermally adaptive material comprises a first material having a first coefficient of thermal expansion dispersed in a matrix of a second material having a second coefficient of thermal expansion.

5. The flow conduit of claim 4, wherein the at least one solid surface is a wall of the conduit.

6. The flow conduit of claim 5, wherein the conduit is configured to undergo a shape change in a radial direction as a result of thermal cycling.

7. The flow conduit of claim 1, wherein the unwanted material accumulated on the at least one solid surface comprises one or more of an inorganic deposit, an organic deposit, a biologic deposit, or an ice frost deposit.

8. A conduit intended for use in a fouling environment comprising:
   at least one solid surface comprising a thermally adaptive material, wherein the at least one solid surface is configured to undergo a shape change in a radial direction as a result of thermal cycling such the shape change dislodges unwanted material accumulated on the at least one solid surface during operation of the conduit in the fouling environment,
   wherein the unwanted material accumulated on the at least one solid surface comprises one or more of an inorganic deposit, an organic deposit, a biologic deposit, or an ice frost deposit; and
   wherein the thermally adaptive material comprises two layers, each of which has a different coefficient of thermal expansion such that the conduit has an oval cross-section at a first temperature and a circular cross-section at an operation temperature which is higher than the first temperature.

9. The conduit of claim 8, wherein the thermally adaptive material comprises a first material having a first coefficient of thermal expansion dispersed in a matrix of a second material having a second coefficient of thermal expansion.

* * * * *